(12) United States Patent
Sengstaken, Jr.

(10) Patent No.: US 10,108,892 B2
(45) Date of Patent: *Oct. 23, 2018

(54) WIRELESS TAG APPARATUS AND RELATED MEDICATION COMPLIANCE MONITORING TECHNIQUES

(71) Applicant: Vypin, LLC, Alpharetta, GA (US)

(72) Inventor: Robert W. Sengstaken, Jr., Hollis, NH (US)

(73) Assignee: VYPIN, LLC, Alpharetta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/813,324

(22) Filed: Nov. 15, 2017

(65) Prior Publication Data
US 2018/0075330 A1    Mar. 15, 2018

Related U.S. Application Data

(63) Continuation of application No. 14/686,916, filed on Apr. 15, 2015, now Pat. No. 9,904,885, which is a
(Continued)

(51) Int. Cl.
*H04Q 5/22* (2006.01)
*G06K 19/07* (2006.01)
(Continued)

(52) U.S. Cl.
CPC .......... *G06K 19/0716* (2013.01); *A61J 1/035* (2013.01); *A61J 7/04* (2013.01); *A61J 7/049* (2015.05);
(Continued)

(58) Field of Classification Search
CPC .......... G06K 19/0716; A61J 1/035; A61J 7/04; A61J 7/049; A61J 7/0436; A61J 7/0472; A61J 7/0454; A61J 7/0481; A61J 2200/30
See application file for complete search history.

(56) References Cited

U.S. PATENT DOCUMENTS 4,617,557 A    10/1986   Gordon
4,823,982 A     4/1989   Aten et al.
(Continued)

FOREIGN PATENT DOCUMENTS

WO    2013023804 A1    2/2013

*Primary Examiner* — Adnan Aziz
(74) *Attorney, Agent, or Firm* — Hayes Soloway PC

(57) ABSTRACT

A wireless tag apparatus and related medication compliance monitoring techniques are disclosed. In some embodiments, the apparatus may include a motion detector configured to detect at least one of a movement of and an impact to the apparatus. The apparatus also may include a sensing circuit configured to scan, in response to the detection by the motion detector, a sensor array associated with a medication dispenser external to the apparatus to determine whether contents of at least one medication compartment of the medication dispenser have been expelled. The apparatus further may include a transmitter configured to transmit, in response to the detection by the motion detector, a signal including data pertaining to whether the contents of the at least one medication compartment have been expelled, wherein the signal is a radio frequency signal. In some embodiments, the apparatus may be configured for use, for example, in monitoring medication compliance.

26 Claims, 8 Drawing Sheets

Related U.S. Application Data continuation-in-part of application No. 14/304,195, filed on Jun. 13, 2014.

(60) Provisional application No. 61/974,770, filed on Apr. 3, 2014, provisional application No. 61/902,316, filed on Nov. 11, 2013, provisional application No. 61/902,325, filed on Nov. 11, 2013, provisional application No. 61/839,561, filed on Jun. 26, 2013.

(51) Int. Cl.
*A61J 1/03* (2006.01)
*A61J 7/04* (2006.01)

(52) U.S. Cl.
CPC ............ *A61J 7/0436* (2015.05); *A61J 7/0454* (2015.05); *A61J 7/0472* (2013.01); *A61J 7/0481* (2013.01); *A61J 2200/30* (2013.01)

(56) References Cited

U.S. PATENT DOCUMENTS

| | | |
|---|---|---|
| 5,014,851 A | 5/1991 | Wick |
| 5,323,907 A | 6/1994 | Kalvelage |
| 5,412,372 A | 5/1995 | Parkhurst et al. |
| 5,791,478 A | 8/1998 | Kalvelage et al. |
| 5,852,590 A | 12/1998 | de la Huerga |
| 6,052,093 A | 4/2000 | Yao et al. |
| 6,058,374 A * | 5/2000 | Guthrie ................ G01D 4/004 705/28 |
| 6,188,678 B1 | 2/2001 | Prescott |
| 6,244,462 B1 | 6/2001 | Ehrensvard et al. |
| 6,411,567 B1 | 6/2002 | Niemiec |
| 6,542,114 B1 | 4/2003 | Eagleson et al. |
| 6,574,166 B2 | 6/2003 | Niemiec |
| 6,720,888 B2 | 4/2004 | Eagleson et al. |
| 7,113,101 B2 | 9/2006 | Petersen et al. |
| 7,394,381 B2 | 7/2008 | Hanson et al. |
| 7,414,571 B2 | 8/2008 | Schantz et al. |
| 7,541,942 B2 | 6/2009 | Cargonja et al. |
| 7,688,206 B2 | 3/2010 | Carrender |
| 7,768,393 B2 | 8/2010 | Nigam |
| 7,937,829 B2 | 5/2011 | Petersen et al. |
| 7,940,173 B2 | 5/2011 | Koen |
| 7,944,350 B2 | 5/2011 | Culpepper et al. |
| 7,956,746 B2 | 6/2011 | Truscott et al. |
| 8,026,814 B1 | 9/2011 | Heinze et al. |
| 8,085,135 B2 | 12/2011 | Cohen Alloro et al. |
| 8,102,271 B2 | 1/2012 | Heo et al. |
| 8,125,339 B2 | 2/2012 | Neuwirth |
| 8,193,918 B1 | 6/2012 | Shavelsky et al. |
| 8,217,809 B2 | 7/2012 | Westhues et al. |
| 8,279,076 B2 * | 10/2012 | Johnson ................ G08B 21/24 340/309.16 |
| 8,334,773 B2 | 12/2012 | Cova et al. |
| 8,339,244 B2 | 12/2012 | Peden, II et al. |
| 8,351,546 B2 | 1/2013 | Vitek |
| 8,373,562 B1 | 2/2013 | Heinze et al. |
| 8,395,496 B2 | 3/2013 | Joshi et al. |
| 8,432,274 B2 | 4/2013 | Cova et al. |
| 8,471,715 B2 | 6/2013 | Solazzo et al. |
| 8,487,757 B2 | 6/2013 | Culpepper et al. |
| 8,494,581 B2 | 6/2013 | Barbosa et al. |
| 8,514,082 B2 | 8/2013 | Cova et al. |
| 8,515,389 B2 | 8/2013 | Smetters et al. |
| 8,526,884 B1 | 9/2013 | Price et al. |
| 8,532,718 B2 | 9/2013 | Behzad et al. |
| 8,960,440 B1 * | 2/2015 | Kronberg ................ A61J 1/035 206/531 |
| 9,387,148 B2 | 7/2016 | Rosenbaum et al. |
| 2001/0028308 A1 | 10/2001 | De La Huerga |
| 2002/0017996 A1 | 2/2002 | Niemiec |
| 2003/0007421 A1 | 1/2003 | Niemiec et al. |
| 2003/0036354 A1 | 2/2003 | Lee et al. |
| 2005/0052315 A1 | 3/2005 | Winterling et al. |
| 2005/0237198 A1 | 10/2005 | Waldner et al. |
| 2005/0266808 A1 | 12/2005 | Reunamaki et al. |
| 2006/0047480 A1 | 3/2006 | Lenz et al. |
| 2006/0202830 A1 | 9/2006 | Scharfeld et al. |
| 2006/0218011 A1 * | 9/2006 | Walker ................ A61J 7/04 705/3 |
| 2007/0097792 A1 * | 5/2007 | Burrows ................ G06F 19/322 368/10 |
| 2007/0211768 A1 | 9/2007 | Cornwall et al. |
| 2008/0053040 A1 | 3/2008 | Petersen et al. |
| 2008/0068217 A1 | 3/2008 | Van Wyk et al. |
| 2009/0295572 A1 | 12/2009 | Grim, III et al. |
| 2010/0018155 A1 * | 1/2010 | Forst ................ B29C 65/18 53/64 |
| 2010/0182131 A1 | 7/2010 | Baithes et al. |
| 2011/0030875 A1 | 2/2011 | Conte et al. |
| 2011/0077909 A1 | 3/2011 | Gregory et al. |
| 2011/0100862 A1 * | 5/2011 | Turkington ................ A61J 1/035 206/531 |
| 2011/0105955 A1 * | 5/2011 | Yudovsky ................ G01P 15/0802 600/595 |
| 2011/0128129 A1 | 6/2011 | Graczyk et al. |
| 2011/0227734 A1 * | 9/2011 | Ortenzi ................ G08B 13/1436 340/568.1 |
| 2012/0161942 A1 | 6/2012 | Muellner et al. |
| 2013/0041623 A1 | 2/2013 | Kumar et al. |
| 2013/0222135 A1 * | 8/2013 | Stein ................ A61J 7/0409 340/540 |
| 2013/0285681 A1 | 10/2013 | Wilson et al. |
| 2014/0197531 A1 * | 7/2014 | Bolognia ................ G06K 9/0002 257/693 |
| 2014/0266760 A1 * | 9/2014 | Burke, Jr. ................ G08B 21/24 340/687 |
| 2014/0290394 A1 | 10/2014 | Grossmann et al. |
| 2015/0002274 A1 | 1/2015 | Sengstaken, Jr. |
| 2015/0130637 A1 | 5/2015 | Sengstaken, Jr. |
| 2016/0120758 A1 * | 5/2016 | Pi ................ A61J 1/03 340/870.07 |

* cited by examiner

WIRELESS TAG APPARATUS AND RELATED MEDICATION COMPLIANCE MONITORING TECHNIQUES

CROSS-REFERENCE TO RELATED APPLICATIONS

This patent application is a Continuation of U.S. patent application Ser. No. 14/686,916, filed on Apr. 15, 2015, and titled "Wireless Medication Compliance Sensing Device, System, and Related Methods," which is a Continuation-in-Part of U.S. patent application Ser. No. 14/304,195, filed on Jun. 13, 2014, and titled "Asset Tag Apparatus and Related Methods," which claims the benefit of each of: (1) U.S. Provisional Application No. 61/974,770, filed on Apr. 3, 2014, and titled "Asset Tag Apparatus and Related Methods"; (2) U.S. Provisional Application No. 61/902,325, filed on Nov. 11, 2013, and titled "Bluetooth Stockbin Indicator Tag"; (3) U.S. Provisional Application No. 61/902,316, filed on Nov. 11, 2013, and titled "Bluetooth Asset Tag Signpost"; and (4) U.S. Provisional Application No. 61/839,561, filed on Jun. 26, 2013, and titled "Bluetooth Asset and Sensor Tag." Furthermore, this patent application is related to U.S. patent application Ser. No. 15/813,473, filed on Nov. 15, 2017, and titled "Sensor Array, Method of Making Same, and Related Medication Compliance Monitoring Techniques." Each of these patent applications is herein incorporated by reference in its entirety.

FIELD OF THE DISCLOSURE

The present disclosure is generally related to a sensing, monitoring, and locating device, and more particularly is related to a wireless medication compliance sensing device, system, and related methods.

BACKGROUND

Medications used in health care and treatment are often prescribed by medical professionals with instructions for the patient to take specific doses of the medication at specific times or intervals. To assist with proper dosage, the medications are often packaged in compartments of a blister package (i.e., a plastic material container comprising a number of sealable compartments having an open side intended to accommodate a drug dosage). These compartments are covered with a breakable cover. The blister pack is covered with a single breakable material, such as foil, or individual breakable flaps, in order to obtain a tight closure of the compartments and secure individual packaging. Generally, the compartments are arranged as a matrix configuration including a number of lines and/or columns. Typically, the rows can be times of the day, and the columns can be days of the week or the month.

Ensuring a patient takes the appropriate dose of medication at the instructed time or interval is often a key aspect to successful medical treatment. Some prior art devices provide monitoring or detection of the blister pack to identify when medication is removed from the blister pack. However, these devices are unable to monitor the blister pack fully (e.g., they're unable to monitor each individual medication compartment, which medication is taken, at what time, etc.) to ensure that the proper medication is taken by the patient. Furthermore, these conventional systems are often cumbersome to use since they require hardwired power supplies or battery-based power supplies which frequently require recharging, and they often require additional hardware for enabling any communication of the monitored condition of the blister pack, among other shortcomings.

Thus, a heretofore unaddressed need exists in the industry to address the aforementioned deficiencies and inadequacies.

SUMMARY

One example embodiment provides a wireless tag apparatus. The wireless tag apparatus includes a motion detector configured to detect at least one of a movement of the wireless tag apparatus and an impact to the wireless tag apparatus. The wireless tag apparatus further includes a sensing circuit configured to scan, in response to the detection by the motion detector of the at least one of the movement of the wireless tag apparatus and the impact to the wireless tag apparatus, a sensor array associated with a medication dispenser external to the wireless tag apparatus to determine whether contents of at least one medication compartment of the medication dispenser have been expelled. The wireless tag apparatus further includes a transmitter configured to transmit, in response to the detection by the motion detector of the at least one of the movement of the wireless tag apparatus and the impact to the wireless tag apparatus, a first signal including data pertaining to whether the contents of the at least one medication compartment have been expelled, wherein the first signal is a radio frequency signal. In some cases: to determine whether the contents of the at least one medication compartment have been expelled, the sensing circuit is configured to detect whether a resistor of the sensor array has been broken, the resistor being disposed over an opening associated with the at least one medication compartment; and the data pertaining to whether the contents of the at least one medication compartment have been expelled includes data pertaining to whether the resistor has been broken. In some such cases: the sensing circuit is further configured to scan the sensor array to determine whether each individual resistor of a plurality of resistors of the sensor array is operational; and the first signal further includes data pertaining to whether each individual resistor of the plurality of resistors is operational. In some instances, the first signal further includes data pertaining to at least one of: an identification of the wireless tag apparatus; whether the wireless tag apparatus is operational; whether the sensor array is operational; whether the wireless tag apparatus and the sensor array are operatively coupled with one another; a size of the sensor array; a power level of a battery hosted by the wireless tag apparatus; and a signal strength of the first signal. In some cases, the first signal is a Bluetooth signal in an ISM band having a frequency of between 2.4-2.485 GHz. In some other cases, the first signal is a Wi-Fi signal in an ISM band having a frequency of between 2.4-2.485 GHz. In some instances, the transmitter is configured to transmit the first signal after each scan of the sensor array by the sensing circuit. In some instances, the transmitter is configured to transmit the first signal after multiple consecutive scans of the sensor array by the sensing circuit. In some cases, the sensing circuit is configured to scan the sensor array: at a first scan rate when the motion detector has detected the at least one of the movement of the wireless tag apparatus and the impact to the wireless tag apparatus; and at a second scan rate that is lower than the first scan rate when the motion detector has not detected at least one of the movement of the wireless tag apparatus and the impact to the wireless tag apparatus. In some instances, the sensing circuit is further configured to scan the sensor array at a fixed time interval.

In some cases, the wireless tag apparatus further includes a processor, wherein: the motion detector is configured to output a second signal in response to the detection of the at least one of the movement of the wireless tag apparatus and the impact to the wireless tag apparatus. Additionally, in such cases, the processor is configured to receive the second signal and, in response thereto: transition out of a sleep state; process data included in the second signal; and instruct the sensing circuit to scan the sensor array. In some such instances, the processor includes a microcontroller unit configured to utilize a Bluetooth Low Energy communication protocol. In some cases, the motion detector includes a microelectromechanical systems accelerometer configured to use 10 µAh or less of electric charge provided by a battery hosted by the wireless tag apparatus. In some instances, the wireless tag apparatus further includes: a timer configured to output a second signal periodically. Additionally, in such cases, the wireless tag apparatus further includes: a processor configured to receive the second signal and, in response thereto: transition out of a sleep state; and instruct the sensing circuit to scan the sensor array. In some such instances, the timer is native to the processor. In some cases, the wireless tag apparatus further includes: a button feature configured to output a second signal when activated. Additionally, in such cases, the wireless tag apparatus further includes: a processor configured to receive the second signal and, in response thereto: transition out of a sleep state; and instruct the sensing circuit to scan the sensor array. In some instances, the wireless tag apparatus further includes a sensor array input connection configured to be electrically coupled with the sensor array. In some cases, the medication dispenser includes a blister pack.

Another example embodiment provides a method of monitoring medication compliance via a wireless tag apparatus. The method includes detecting at least one of a movement of the wireless tag apparatus and an impact to the wireless tag apparatus. The method further includes scanning, in response to detecting the at least one of the movement of the wireless tag apparatus and the impact to the wireless tag apparatus, a sensor array associated with a medication dispenser external to the wireless tag apparatus to determine whether contents of at least one medication compartment of the medication dispenser have been expelled. The method further includes transmitting, in response to detecting the at least one of the movement of the wireless tag apparatus and the impact to the wireless tag apparatus, a first signal including data pertaining to whether the contents of the at least one medication compartment have been expelled, wherein the first signal is a radio frequency signal. In some cases: to determine whether the contents of the at least one medication compartment have been expelled, the method includes detecting whether a resistor of the sensor array has been broken, the resistor being disposed over an opening associated with the at least one medication compartment; and the data pertaining to whether the contents of the at least one medication compartment have been expelled includes data pertaining to whether the resistor has been broken. In some such cases: the method further includes scanning the sensor array to determine whether each individual resistor of a plurality of resistors of the sensor array is operational; and the first signal further includes data pertaining to whether each individual resistor of the plurality of resistors is operational. In some instances, the first signal further includes data pertaining to at least one of: an identification of the wireless tag apparatus; whether the wireless tag apparatus is operational; whether the sensor array is operational; whether the wireless tag apparatus and the sensor array are operatively coupled with one another; a size of the sensor array; a power level of a battery hosted by the wireless tag apparatus; and a signal strength of the first signal. In some cases, the first signal is a Bluetooth signal in an ISM band having a frequency of between 2.4-2.485 GHz. In some other cases, the first signal is a Wi-Fi signal in an ISM band having a frequency of between 2.4-2.485 GHz. In some instances, transmitting the first signal occurs after each scan of the sensor array by the sensing circuit. In some instances, transmitting the first signal occurs after multiple consecutive scans of the sensor array by the sensing circuit. In some cases, scanning the sensor array occurs: at a first scan rate when the at least one of the movement of the wireless tag apparatus and the impact to the wireless tag apparatus has been detected; and at a second scan rate that is lower than the first scan rate when at least one of the movement of the wireless tag apparatus and the impact to the wireless tag apparatus has not been detected. In some instances, scanning the sensor array occurs at a fixed time interval.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
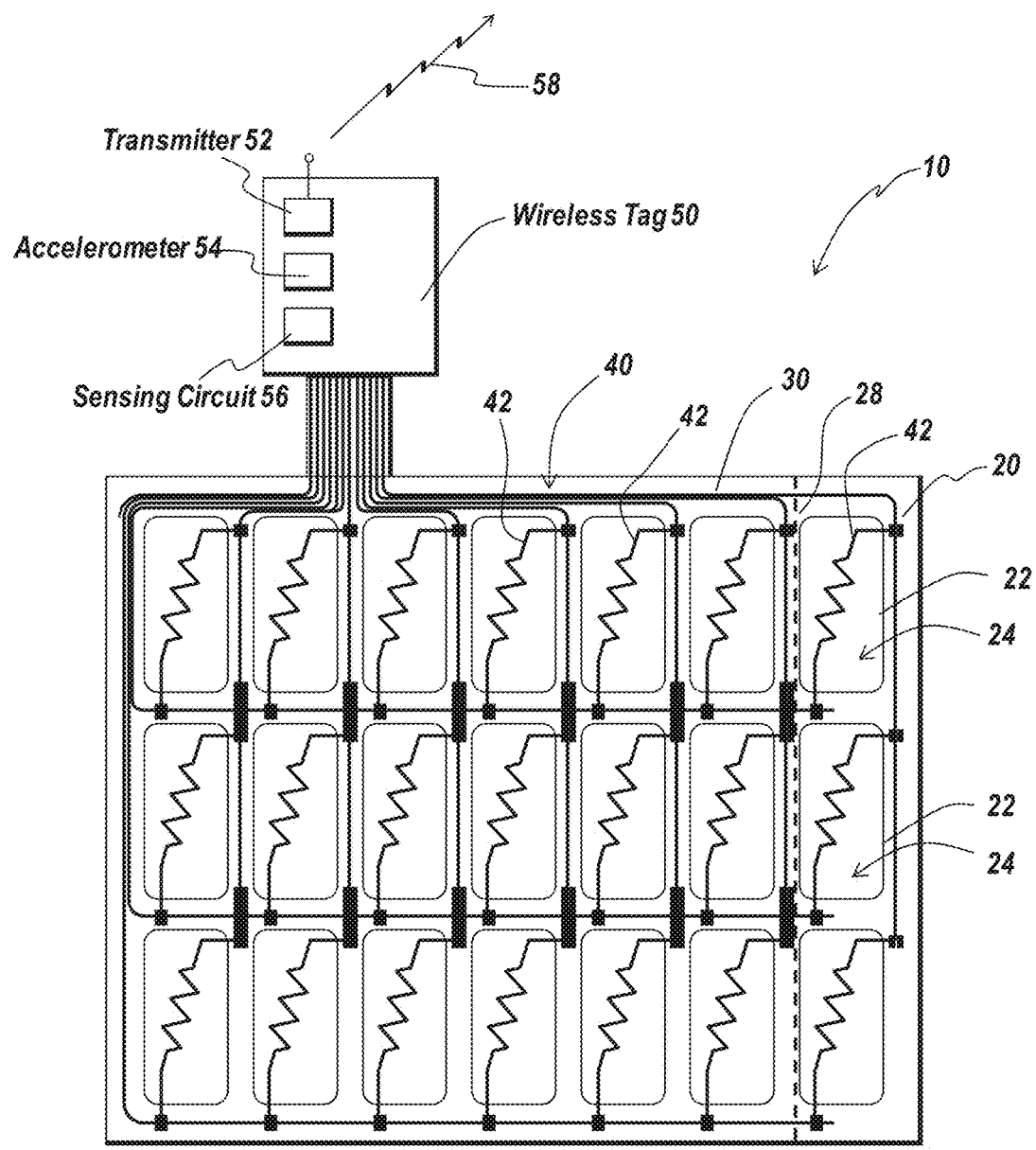
FIG. 1 is a schematic illustration of a system for wireless medication compliance sensing, in accordance with a first exemplary embodiment of the present disclosure.

FIG. 1 is a schematic illustration of a system for wireless medication compliance sensing 10, in accordance with a first exemplary embodiment of the present disclosure. The system for wireless medication compliance sensing 10, which may be referred to simply as 'system 10,' includes a housing 20 having a plurality of medication compartments 22. A breakable substrate 30 is positioned on at least one side of the housing 20, wherein the breakable substrate 30 covers an opening 24 to the plurality of medication compartments 22. A sensor array 40 is positioned on the at least one side of the housing 20. The sensor array 40 has a plurality of resistors 42, wherein one of the plurality of resistors 42 is positioned across one of the openings 24 of the plurality of medication compartments 22. A wireless tag 50 is connectable to the sensor array 40. The wireless tag 50 has a transmitter 52, an accelerometer 54, and a sensing circuit 56, wherein the sensing circuit 56 is adapted to scan the sensor array 40 upon activation of the accelerometer 54, and wherein the transmitter 52 transmits a signal 58 having scanned sensor array data externally from the wireless tag 50.

This system 10 may provide a convenient way to verify when medication is removed from a blister pack or similar medication housing, where the medication is stored in a particular arrangement for patient retrieval. The verification of medication compliance is one aspect of improving the health, care, and treatment of patients who must take a variety of medications periodically. The housing 20 may have a variety of sizes and may include any number of medication compartments 22 in a variety of patterns or arrays. For example, an array of 3×1, 5×1, 3×7, and/or 5×7 medication compartments 22 may be used, among other sizes. The number of medication compartments 22 may be keyed to the scheduled frequency of the patient taking the medication housed therein.

While FIG. 1 does not illustrate the medication, it may be packaged within the medication compartments 22 of the housing 20, which together may be considered a blister pack, as is known in the art. The medication compartments 22 may be formed from molding or otherwise creating individual compartments within a single plastic sheet or a sheet made from another material. Each of the medication compartments 22 has an opening 24 which is sealed with the breakable substrate 30. This substrate 30 may be a paper-based substrate, a foil-based substrate, or another material which is capable of being broken or punctured by the user in a position over the openings 24, thereby allowing the user to access the medication held within the medication compartment 22. The breakable substrate 30 is positioned on the housing 20, such as by being affixed to the housing 20 with an adhesive or sealing technique, to seal the medication within the medication compartments 22. When the medication is filled in each medication compartment 22 with the breakable substrate 30 applied to the housing 20, the medication may be hermetically sealed within the medication compartments 22 of the housing 20.

The system 10 uses the sensor array 40 and the wireless tag 50 to monitor when the medication is removed from the medication compartments 22. Specifically, the sensor array 40 includes conductive lines which are positioned spaced around the medication compartments 22 with individual resistors 42 positioned over the openings 24 of the medication compartments 22. The sensor array 40 may be created by various techniques, such as by printing electrically conductive ink directly on to the breakable substrate 30, by forming the conductive lines on another substrate which is positioned abutting or substantially abutting the breakable substrate 30, or with other methods. The end result may be the sensor array 40 formed with the resistors 42 positioned over the openings 24, such that when the breakable substrate 30 is punctured over the openings 24, the resistor 42 corresponding to that opening 24 is severed.

The wireless tag 50 may be connectable to the sensor array 40, often removably connectable such that the wireless tag 50 may be used repeatedly for subsequent blister packs. The wireless tag 50 has a transmitter 52 for transmitting signals externally from the wireless tag 50, an accelerometer 54 for monitoring a movement or motion of the housing 20, such as when it is moved by the user, and a sensing circuit 56 including various circuitry for periodically scanning the sensor array 40. For example, the sensing circuit 56 may scan the sensor array 40 upon activation of the accelerometer 54 (e.g., upon movement of the housing 20) to scan the operational state of each resistor 42 within the sensor array 40, which in turn can be indicative of whether medication has been removed from a medication compartment 22 corresponding to that resistor 42. It may be common for the sensing circuit 56 to only scan the sensor array 40 upon activation of the accelerometer 54 in order to preserve battery life of the wireless tag 50 in comparison to constant or periodic scans of the sensor array 40. In one of many alternatives, the sensing circuit 56 may scan the sensor array 40 at low-frequency spaced intervals (e.g., one scan per 10 seconds) when the accelerometer 54 is not activated and high-frequency spaced intervals (e.g., 10 scans per one second) when the accelerometer 54 is activated.

Initially, the sensing circuit 56 and/or processor 62 may detect when the wireless tag 50 is first connected to the sensor array 40, and it may scan the sensor array 40 to determine if there is a good connection by testing each resistor 42 and the size of the matrix of the sensor array 40. The sensing circuit 56 may sense the number of rows and columns within the sensor array 40 to identify the size of the sensor array 40. As an example, a 3×7 sensor array 40 may require ten contacts between the wireless tag 50 and the sensor array 40.

The scan may result in scanned sensor array data, which may include any data pertinent to the sensor array 40 or the wireless tag 50 itself. For example, the scanned sensor array data may include an identification of the wireless tag 50, a functioning state of the wireless tag 50, a state of each of the plurality of resistors 42 (e.g., whether each resistor 42 is severed or not), a size of the sensor array 40, or a size of the blister pack, or other information. Identification of the wireless tag 50 may also be retrieved using a serial number chip stored on the sensor package. Signals communicated can be used to read the serial number. While transmission of the scanned sensor array data may not be required after each scan, the transmitter 52 may transmit the signal 58 externally from the wireless tag 50 to communicate the scanned sensor array data to another device, such as a mobile electronic device, a server, or other database which stores or processes the scanned sensor array data, as discussed further relative to FIG. 8.

The system 10 may include a number of additional features and components. For example, as is shown in FIG. 1, the housing 20 may be perforated at perforation line 28 to allow for a portion of the medication compartments 22 to be separated or removed from the housing 20 as a whole. The ability to separate a portion of the medication compartments 22 may allow a user to take a few days of medication instead of the entire housing 20 when they go on a weekend trip or other excursion where it may not be desirable to take the entire housing 20. The sensor array 40 may still be capable of operating after removal of the perforated portion of medication compartments 22.

Figure 2:
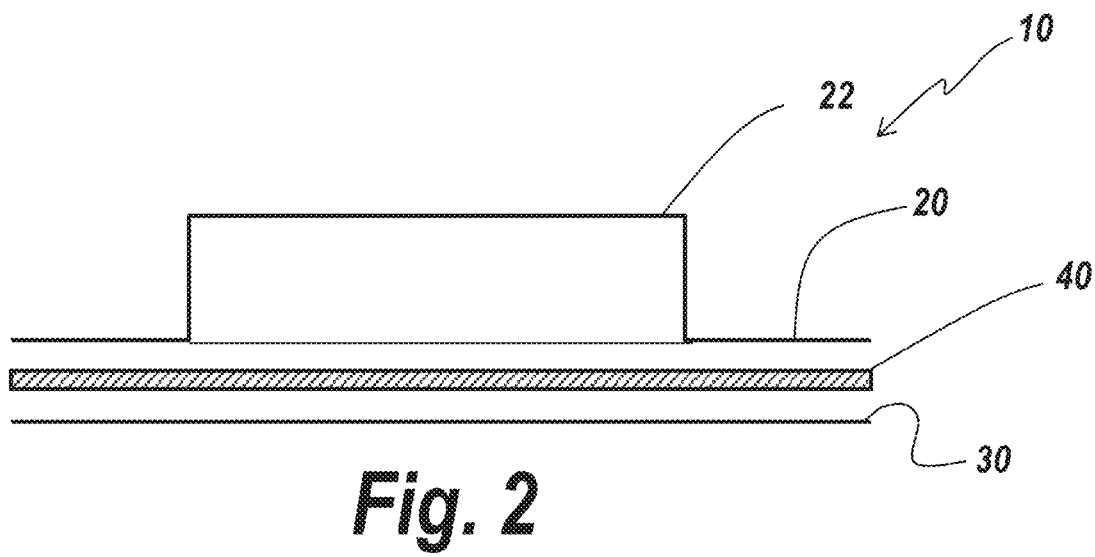
FIG. 2 is a side view schematic illustration of the system for wireless medication compliance sensing of FIG. 1, in accordance with the first exemplary embodiment of the present disclosure.

FIG. 2 is a side view schematic illustration of the system for wireless medication compliance sensing 10 of FIG. 1, in accordance with the first exemplary embodiment of the present disclosure. Specifically, FIG. 2 illustrates the detailed layers of the housing 20, the breakable substrate 30, and the sensor array 40 in one example. As is shown, the housing 20 may form the top layer as a plastic bubble array having the medication compartment 22 integrally formed within the housing 20 material. The sensor array 40 may be positioned as a middle layer, proximate or abutting the housing 20, and may be printed on a thin layer of material, such as a 2-millimeter or 3-millimeter layer of plastic. The breakable substrate 30 may be formed from a conventional foil-backed paper, or similar material, and positioned as the bottom layer. An adhesive, such as a pressure adhesive or thermal adhesive, may be applied to all surfaces to hermetically seal the three materials together.

Figure 3:
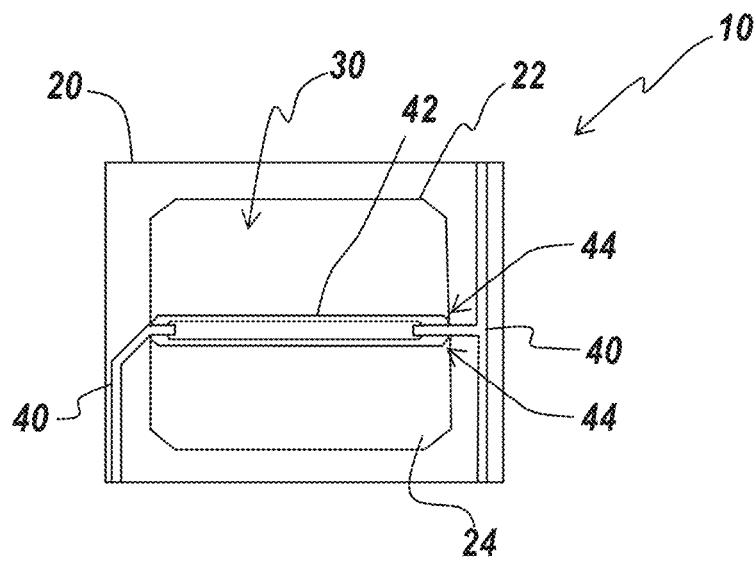
FIG. 3 is a top view schematic illustration of the sensor array over an opening in the system for wireless medication compliance sensing of FIG. 1, in accordance with the first exemplary embodiment of the present disclosure.

FIG. 3 is a top view schematic illustration of the sensor array 40 over an opening 24 in the system for wireless medication compliance sensing 10 of FIG. 1, in accordance with the first exemplary embodiment of the present disclosure. As is shown, the sensor array 40 has a plurality of conductive traces which are positioned proximate to the medication compartment 22 on the housing 20. The resistor 42 of the sensor array 40 is electrically connected to the conductive traces of the sensor array 40 and is positioned over the opening 24. A portion of the resistor 42, for example, the crossbar, not the electrically conductive portion, may be cut at its ends 44 (e.g., a location along the resistor 42 where it is positioned at an edge of the opening 24) to allow the resistor 42 to be easily severed. When the breakable substrate 30 is printed on an insulating plastic material, the portion of the breakable substrate 30 which contains the opening 24 may be die-cut to allow the user to easily gain access to the medication compartment 22, such as, for example, by punching or forcing the portion of the breakable substrate 30 aligned with the opening 24 until it severs along the die-cut outline (outline of opening 24). The ends 44 of the resistor 42 are preferably aligned with the die-cut outline to ensure the electrical circuit is severed when the patient accesses the medication compartment 22.

Figure 6:
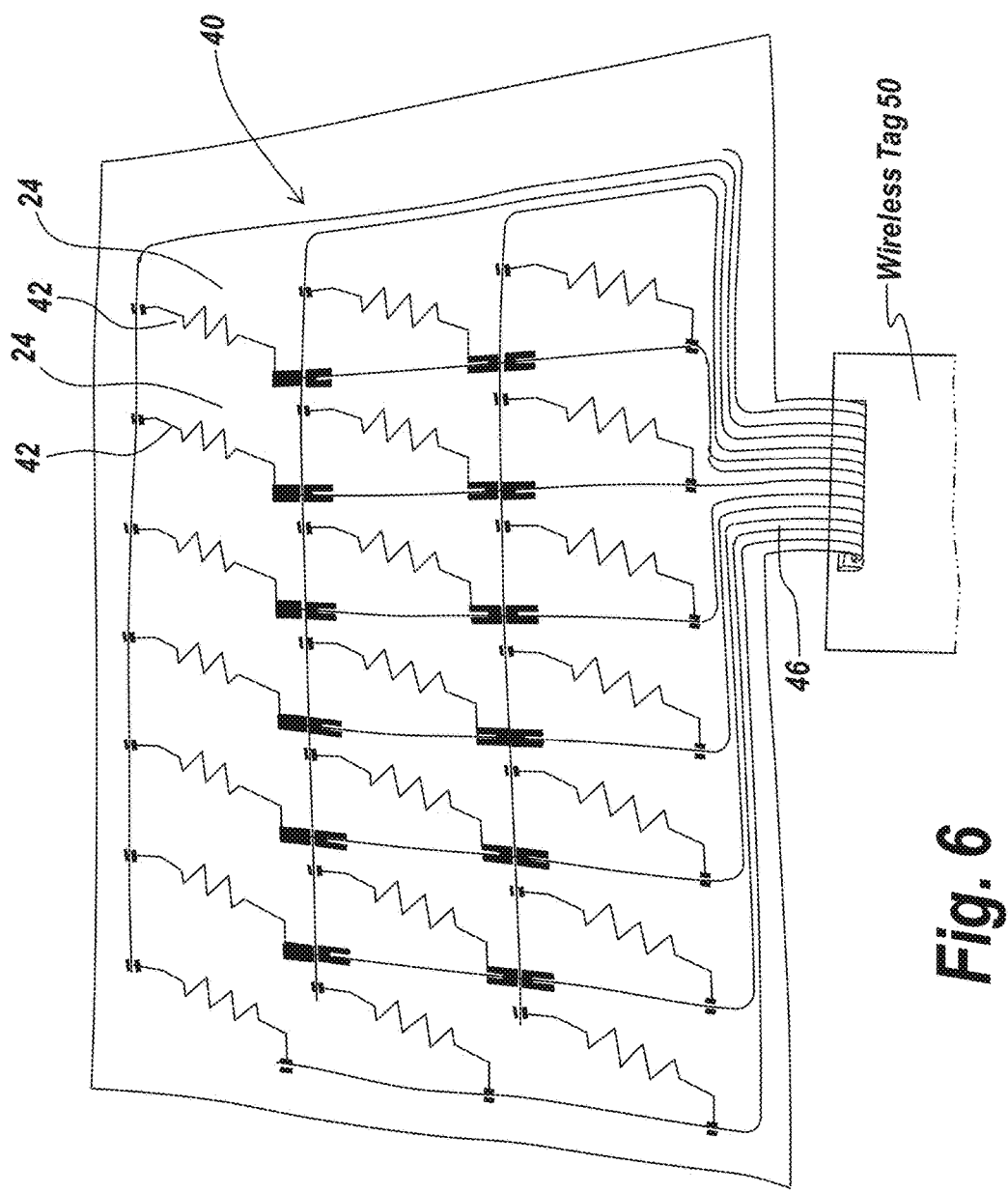
FIG. 6 is a schematic illustration of the sensor array for a housing with a 3×7 array of medication compartment openings in the system for wireless medication compliance sensing of FIG. 1, in accordance with the first exemplary embodiment of the present disclosure.

The manufacture of the sensor array 40 on the breakable substrate 30 may vary. For example, when the sensor array 40 is printed on a plastic insulating material which is die-cut, a final layer of material is required on the backside of the plastic insulating material to seal the sensor array 40 therein. This final layer may be a non-conductive layer which ensures successful sensor array 40 operation. In another example, the sensor array 40 may be printed on a paper-based breakable substrate 30 (as shown in FIG. 6), where no additional layers to seal the sensor array 40 are required. In any manufacturing process of the sensor array 40 on breakable substrate 30, it may be desirable to ensure that all layers of the breakable substrate 30 be easily punctured or ripped at the location along the sensor array 40 to ensure circuit breakage.

The sensor array 40 with resistor 42 shown in FIG. 3 may be manufactured without significant commonly used manufacturing processes, thereby providing a system 10 with a sensor array 40 that can be fully tested before final assembly of the system 10 with the medication. In one example of manufacturing the sensor array 40, the conductors may first be printed in a high-conductive ink on the breakable substrate 30. Then, insulating cross overs may be printed where the horizontal and vertical lines of the sensor array 40 cross. Resistors and cross over connections (on the insulating cross overs) may then be printed with resistive ink. A further description of the manufacturing process of the breakable substrate 30 and/or the sensor array 40 is provided relative to FIG. 6.

Figure 4:
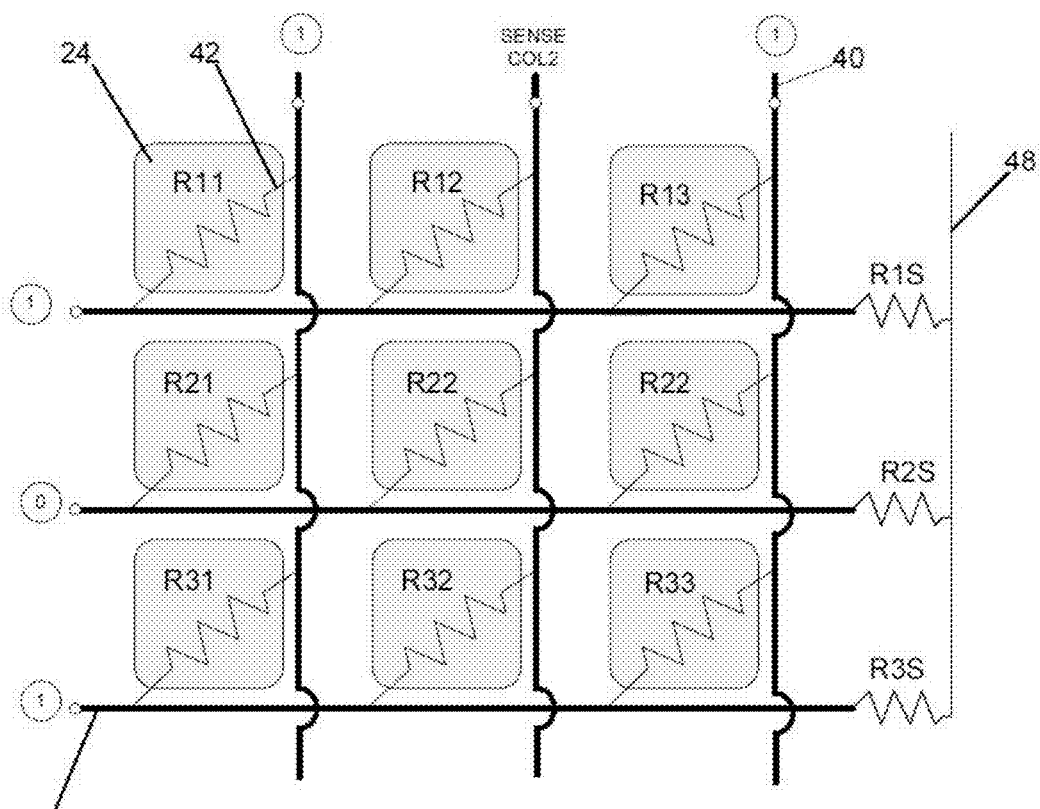
FIG. 4 is a schematic illustration of the sensor array over openings in the system for wireless medication compliance sensing of FIG. 1, in accordance with the first exemplary embodiment of the present disclosure.

FIG. 4 is a schematic illustration of the sensor array 40 over openings 24 in the system for wireless medication compliance sensing 10 of FIG. 1, in accordance with the first exemplary embodiment of the present disclosure. As is shown in FIG. 4, the sensor array 40 is positioned proximate to each opening 24, and a resistor 42 is positioned over each opening 24. The sensor array 40 includes conductive traces formed as columns and rows, each of which is identified with a '1' or '0' in FIG. 4. Similarly, each resistor 42 in FIG. 4 is labeled (e.g., R11, R12, R13, etc.). One benefit of the system 10 may be the ability to sense each opening 24 individually, which is accomplished by scanning each resistor 42 independently of other resistors 42 within the sensor array 40. Prior art techniques to sense sensor arrays, such as those used in computer keyboards, are incapable of sensing resistors 42 on an individual level because only 1 to 3 keys can be closed simultaneously. In contrast, within the system 10, all locations may be closed initially, and the sensing of each resistor 42 may be accomplished by opening each location as it needs to be detected. As an added benefit, this ability to sense locations individually can be done using very little power, thereby allowing the battery power of the wireless tag 50 to run the sensing circuit 56 for a year or more on a single coin cell. The number of rows and verification of system connection in the array can be determined with an extra column connection with a resistor connecting this column to each row.

It is also noted that the system 10 may include a sensor array 40 with additional columns or rows of conductive traces. These additional rows or columns may be considered a control—a control row or control column—for the sensor array 40 and allow the wireless tag 50 to sense the size of the sensor array 40. FIG. 4, as an example, illustrates a control column 48 which is connected to the sensor array using resistors R1S, R2S, and R3S. The control column 48 may allow for automatic detection of the size of the sensor array 40, which may allow for automatic identification of the size of the sensor array 40 when the wireless tag 50 is connected to it. Similarly, this control column or control row may be used to detect when the wireless tag 50 is connected to a new housing 20. The control column 48 may also be used to detect when a portion of the medication compartments 22, such as a column of medication compartments 22, are removed at a perforated line 28.

Figure 5:
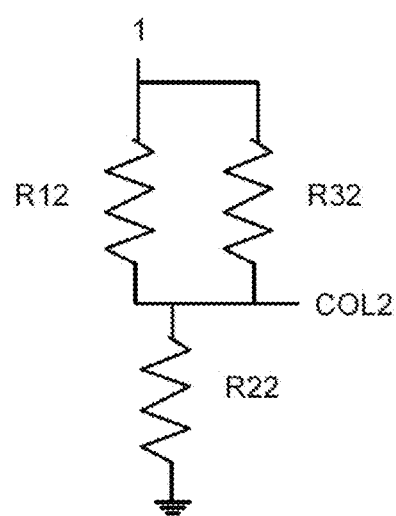
FIG. 5 is a schematic illustration of an equivalent circuit of the sensor array of FIG. 4, in accordance with the first exemplary embodiment of the present disclosure.

FIG. 5 is a schematic illustration of an equivalent circuit of the sensor array 40 of FIG. 4, in accordance with the first exemplary embodiment of the present disclosure. Relative to FIGS. 4-5, the operation for scanning resistors 42 on an individual level is described. Specifically, FIG. 5 illustrates the situation where the center row of the sensor array 40 of FIG. 4 is driven low and all other rows and columns are driven high, as indicated by the '0' and '1' designations in FIG. 4, and the center column, identified as 'Sense Col 2,' is sensed. While the center row and column of the sensor array are used in this example, the same process is repeated for all rows and all columns in the sensor array 40. Using this example, within FIG. 5, the goal is to detect the presence or not of resistor 42 identified as R22. If the resistor 42 is broken, the voltage sensed on column 2 is the high-level voltage. If the resistor 42 is in place, the voltage sensed at column 2 is the voltage division ratio of (R12 and R32 in parallel) and R22. If the resistors 42 are all of the same value, the measured voltage at Sense Col2 would equal 0.667 times the voltage (0.667*V). If either resistor 42 identified as R12 or R32 is broken, then this voltage is lower. The logic at each location is that if the voltage is below 0.667V (plus a tolerance margin), then this location can be identified as being broken, which is indicative of the corresponding medication compartment being opened.

Using the process described relative to FIGS. 4-5, the sensing circuit 56 (FIG. 1) may successfully scan the sensor array 40 to sense an operation of each of the plurality of resistors 42 individually. It is noted that the sensing circuit 56 (FIG. 1) may scan the sensor array 40 at various increments, such as only once every minute or several minutes. The scanning process will drive all the columns to a high level (1) except for one column, which will be sensed with an analog/digital converter. All rows will be driven to a high (1) except for one which will be driven to a low (0).

FIG. 6 is a schematic illustration of the sensor array 40 for a housing 20 with a 3×7 array of medication compartment openings 24 in the system for wireless medication compliance sensing 10 of FIG. 1, in accordance with the first exemplary embodiment of the present disclosure. The sensor array 40 of FIG. 6 may be an example of a printed sensor array 40 on a sheet of material prior to applying it to the housing 20, such as is shown in FIG. 1. The sensor array 40 can be printed in a multilayer printing process wherein conductive traces are first printed, then an insulating ink is printed at the crossover points, a carbon resistor 42 is printed at the crossover points, and finally an overcoat layer is printed to seal the sensor array 40. When this sensor array 40 is printed and die-cut, locating holes may be punched to align this layer with the housing 20 (FIG. 1) during final assembly. The sensor array 40 may include a connector array 46 at a side of the sensor array 40 which may be connectable to the wireless tag 50, as is shown in FIG. 6. As a possible extension of the printing process, it may be possible to print the transistors on the sensor array 40 to decode positions or for providing a serial number or other identification of the sensor array 40.

Figure 7:
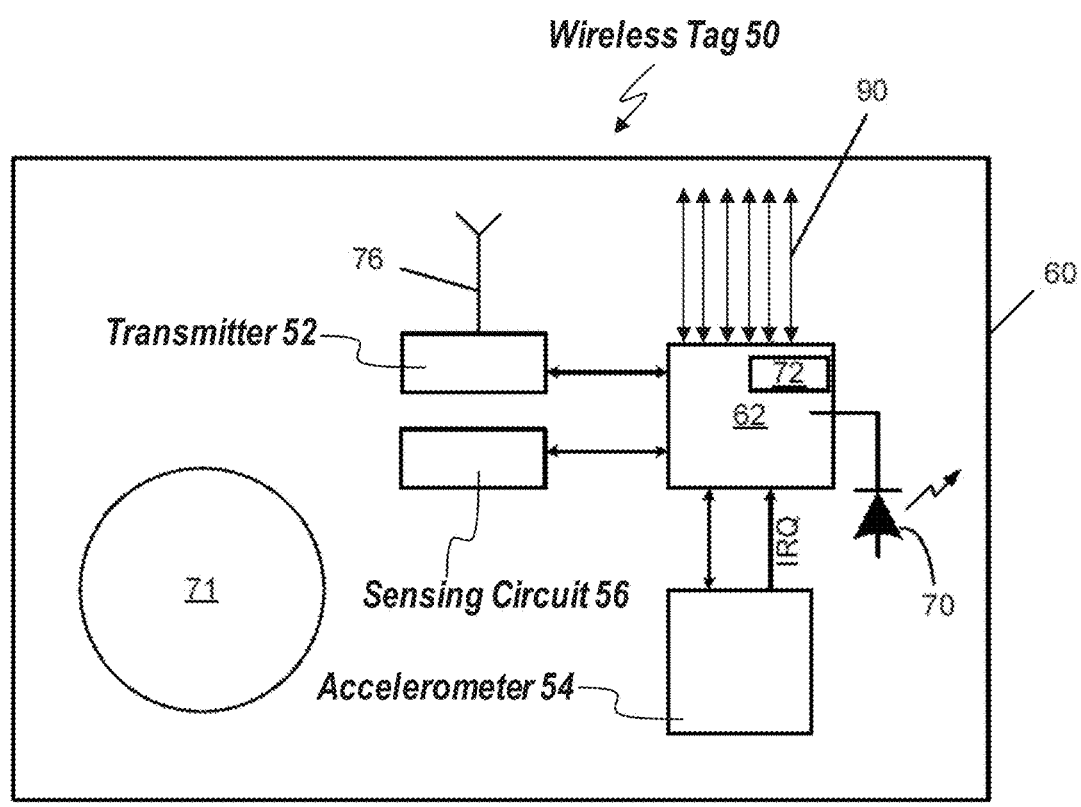
FIG. 7 is a schematic of the wireless tag of the system for wireless medication compliance sensing, in accordance with the first exemplary embodiment of the present disclosure.

FIG. 7 is a schematic of the wireless tag 50 of the system for wireless medication compliance sensing 10, in accordance with the first exemplary embodiment of the present disclosure. The wireless tag 50 may include a housing 60, which may provide the structure for holding other components of the wireless tag 50. The housing 60 may be constructed from a durable material, such as hardened plastic, fiberglass, metal, or another type of material, and may substantially contain the wireless transmitter 52, a processor 62, and the accelerometer 54, along with other components of the wireless tag 50. The housing 60 may be sealable and resistant to the elements, such that it is water-resistant, dust-proof, and resistant to other environmental conditions.

The transmitter 52 may include a short-wavelength ultra-high frequency (UHF) radio wave wireless transmitter which transmits a plurality of signals in an ISM band of between 2.4 GHz to 2.485 GHz. Specifically, the wireless transmitter 52 may be a 2.4 GHz Digital Radio transceiver in communication with a printed circuit board (PCB) antenna 76. The processor 62 may be coupled to transmitter 52. The processor 62 may include a micro-controller unit (MCU) with Bluetooth® protocol enabled. One of the benefits is the use of the Bluetooth®-Low Energy protocol which uses a Bluetooth® beacon payload to periodically transmit the scanned sensor array data as well as other data, such as the device ID. This periodic transmission uses less battery power than other wireless protocols, which allows the wireless tag 50 to function for long periods of time. The periodic beacon can also send out battery status information as well as signal strength with the scanned sensor array data to a Bluetooth® receiver within an external device. Thus, upon receipt of the beacon, the external device can detect that the wireless tag 50 is operational and properly connected to the sensor array 40. Other wireless protocols, such as WiFi®, can also be used in some instances.

The accelerometer 54 may be in communication with the processor 62, wherein the accelerometer 54 uses less than 10 µAh of power. The accelerometer 54 may include a micro-electro-mechanical systems (MEMS) accelerometer in two-way communication with the processor 62. A battery 71 may be positioned within the housing 60 and provide a quantity of power to the processor 62 and the accelerometer 54. The housing 60 may also include an indicator 70, a timer 72, and a sensor array input 90 which is connected to the processor 62, which facilitates connection of the sensor array 40 (FIG. 1) to the wireless tag 50. The indicator 70 may be a light-emitting diode (LED) indicator which is housed at least partially within the housing 60 but is visible from a position external of the housing 60. The timer 72 may be integrated within the processor 62.

The MCU may execute the Bluetooth® protocol from stored program code. The MCU may have permanent storage for a quantity of computer programs and can permanently store configuration and operating parameters of the Bluetooth® protocol. To save power, the MCU is normally in a sleep state where it is not running any code. The MCU is woken up to run code either from an interrupt from one of the devices on the board or by an internal timer. The MEMS accelerometer 54 is configured to detect various events: motion, double-tap, or orientation change. The MEMS accelerometer 54 may wake up the processor 62 by means of an interrupt request (IRQ) or interrupt signal, and the MCU may send control parameters and read data from the accelerometer 54. Thus, upon detection of the event, the MEMS accelerometer 54 generates an interrupt signal to the MCU which causes the MCU to wake up from a sleep state and process the event.

The MCU may also wake up based on an internal timer 72. An antenna 76 may be included for the MCU to transmit and receive radio frequency (RF) energy. The MCU may utilize power management to go to a low-power sleep state. The wireless tag 50 may not perform a Bluetooth® connection protocol to transfer the sensor information, as it is normally transmitting only using the beacon format. Thus, the client receiver does not have to be associated to the wireless tag 50 to receive the information.

The use of a single or double tap detected by the accelerometer 54 may be used to signal an initial device configuration, may associate the wireless tag 50 with an asset by sending special signal code for identification, and may allow a connection between Bluetooth® client and host. The orientation of the wireless tag 50 when it is tapped is used to either turn it on or off, and a different orientation used to turn it off or on, respectively. When it is turned off, it is no longer transmitting RF packets. The turn-off function can be disabled when the device is configured. The configuration can optionally be locked and never changed. A secure key code can be permanently stored; only clients that have the key code can connect and change the operating parameters. The Bluetooth® beacon repetition rate is changed to a higher rate upon a double-tap for a period of time, and a code is sent as part of the beacon to signal the double-tap. The double-tap connection to the client can be disabled with a configuration parameter. This prevents unauthorized changes to the device setup.

When the accelerometer 54 generates a motion detection interrupt, motion detection can be enabled or disabled, motion sensitivity and axis of acceleration can be configured, and an indicator 70 LED flashes to show the motion has been detected. The Bluetooth® beacon repetition rate is changed to a higher rate upon motion detection for a period of time, and a code is sent as part of the beacon to signal the motion detection. The maximum amount of time in the motion detected state can be configured. This prevents the wireless tag 50 from using up the battery 71 when it is in motion for a long period of time, as in truck transport. Minimum motion off time may be provided before re-enabling motion detection, such as, for example, to prevent the motion state being entered every time a truck carrying the asset tag 50 stops at a traffic light. When the accelerometer 54 generates an interrupt due to a change in orientation, orientation changes can be configured and enabled, and orientation can change time delay configuration. The wireless tag 50 may include a "panic" button input used to generate an interrupt to the MCU.

The rules and protocols that are used to operate the wireless tag 50 can be configured to control the beacon transmission rate. These rules are based on time and sensor inputs to provide an immediate alert status and then to reduce the beacon repetition rate to lower battery 71 usage. When the wireless tag 50 is set to airplane mode of operation, it is not transmitting beacons in normal operation; it is waiting for a signal from another device to start transmitting. After the beacons are sent for a programmable period of time, the wireless tag 50 then goes back to a receive-only mode.

Depending on the battery 71 selected, the wireless tag 50 may operate over 5 years. In order to save power, the MCU must be in a sleep mode most of the time. The MCU may wake up from one of several sources: internal timer 72, interrupt from another device in the system, or from a sensor. The internal timer 72 is used to periodically transmit a signal or to monitor sensors or voltages. One of the possible sources for the external interrupt wake-up is from a MEMS accelerometer 54. The internal timer 72 may be used for the MCU to wake up periodically and monitor the sensor array 40 (FIG. 1) connected to the sensor array input 90 which is connected to an analog-to-digital converter input.

Figure 8:
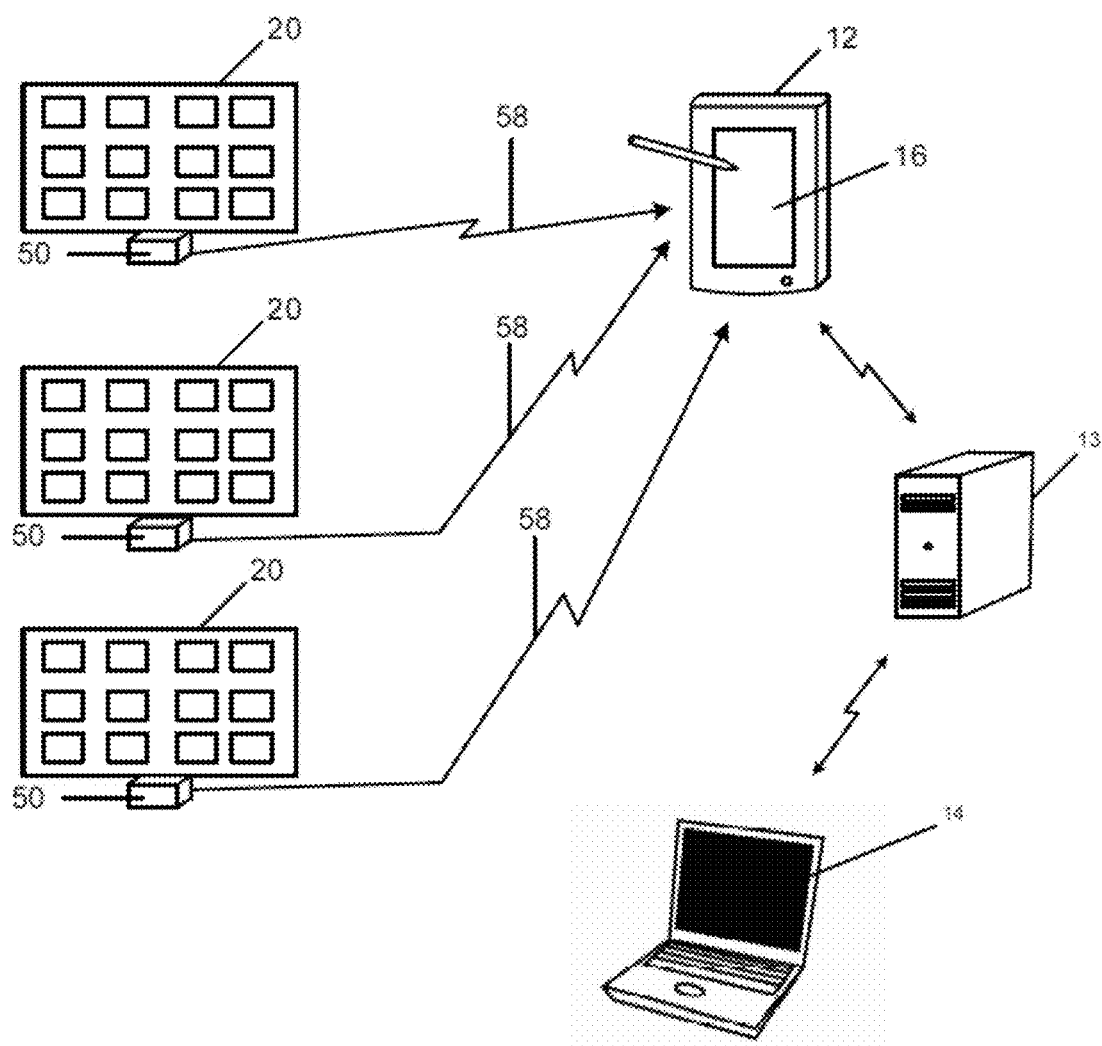
FIG. 8 is a schematic of the system for wireless medication compliance sensing, in accordance with the first exemplary embodiment of the present disclosure.

FIG. 8 is a schematic of the system for wireless medication compliance sensing 10, in accordance with the first exemplary embodiment of the present disclosure. This figure illustrates a typical system connection to transmit the data from the medication compliance system 10 to a computerized device 12, such as a cellphone, a tablet computer, and/or a data bridge. As is shown, a plurality of wireless tags 50 may be used within the system 10 in combination with one another and in combination with a computerized device 12.

As is shown in FIG. 8, each of the wireless tags 50 may be secured to a housing 20 of a blister pack. The wireless tag 50 may be secured to the housing 20 in a variety of ways, as is discussed relative to FIGS. 8-9. The transmitter 52 of the wireless tag 50 may transmit signals 58 to the computerized device 12, depicted as a smart phone, in a variety of ways. For example, in one design, the signal 58 may be transmitted externally from the wireless tag 50 without pre-identification of the computerized device 12 receiving it. In other words, the signal beacon can be transmitted to any available device located within the vicinity, which in turn, can identify the signal 58.

The computerized device 12 may include any type of computer, computer system, or other device utilizing a computer processor. For example, the computerized device 12 may include a personal computer (PC), a laptop computer, a notebook computer, a computerized smart phone, cellular phone, a PDA, a computerized tablet device, or another device. Commonly, the computerized device 12 may be a smart phone, such as an iPhone®, an Android™ phone, or any other cellular phone. Similarly, the computerized device 12 may include an interface device, such as a gaming system or a home automation device (e.g., a WINK® device), or any other computerized device capable of receiving a signal 58. The computerized device 12 may include a variety of hardware and software components, including one or more processors, memory units, databases, and/or programs or software applications, all of which are considered within the scope of the present disclosure. For example, the computerized device 12 may have a computerized program installed within a memory device therein. The computerized program may be any application software, which may be referred to in the industry as an application, or simply an "app." Current examples of these apps are commonly referred to by the entity that creates, markets, or sells the app, such as Apps for iPhone® sold at an app store, or Google® apps. The app may include software code for performing a single action or multiple, related actions or tasks. The app may be compatible with, or used in conjunction with, any other type of system software, middle ware, or program.

The system 10 may be enabled with conventional hardware components and software programs as well as specific apps installed within the computerized device 12 to receive the signal 58 transmitted from the wireless tag 50. For example, the signal 58 may be received on a wireless receiver within the computerized device 12, such as a Bluetooth® receiver, capable of receiving short-wavelength UHF radio waves in an ISM band of between 2.4 GHz and 2.485 GHz. The functioning of the various components of the system 10 and the computerized device 12 may utilize a combination of existing software within the computerized device 12 for transmitting and receiving the wireless signals 58. For example, conventional software may include software associated with the functioning of Bluetooth® communication within the computerized device 12.

The computerized device 12, through the software operating thereon, may provide a graphical user interface (GUI) 16 or display that is capable of displaying information about the wireless tag 50. The GUI 16 of the computerized device 12 may include a listing or indexing of wireless tags 50 that have been detected. Each of the wireless tags 50 may correspond to an item within the list displayed on the GUI 16, and each item displayed may have information indicative of the corresponding system 10. For example, each item displayed may have an identification number of the wireless tag 50 and an indication of activation of the wireless tag 50, among other information. The indication of activation of the wireless tag 50 may be a color-coded system, whereby wireless tags 50 that are currently activated (i.e., wireless tags 50 that have accelerometers 54 that are experiencing an activation) are identified in one color, whereas inactive wireless tags 50 are identified in a different color. The GUI 16 may further include other information about the wireless tags 50, including a listing of the total number of wireless tags 50 detected.

Although not required, there are system configurations where the wireless tag 50 can be monitored on a server 13 using a data bridge, where the server 13 receives information from the computerized device 12. In this case, the data is forwarded to the server 13 over the data bridge (e.g., standard network lines or wireless channels). The database in the server 13 may be viewable using a standard web interface from any computer network, such as from a remotely positioned computer 14 which has a web browser for viewing the data. This data bridge may transfer the short-range signal 58 from the wireless tag 50 to the Internet where the data, including a data packet with ID, can be stored in a server 13 database. The database may be viewed from any Internet-connected device using a web browser when logged in to the server 13. At the server 13 level, a timestamp of the receipt of the signal having the scanned data may be logged or recorded. Performing this log at the server 13 level may allow the wireless tags 50 to be free from having to record timing, which may eliminate setup of the wireless tag 50 altogether. The wireless tag 50 may transmit a beacon which contains the ID of the package plus additional sensor information. Alternatively, the smartphone or bridge may add a timestamp to the data when it is forwarded to the server 13. In one example, the beacon may be transmitted every 10 seconds, repeating the same data each time. The smartphone or bridge may determine if there is a change in the data packet and only send updates to the server 13 indicating a change in the number of medication usage.

The data received at the server 13 level can be reviewed, verified, or otherwise analyzed by various parties, including the medical professional issuing the medication to the patient, to confirm that the medication was taken by the patient or not. If the data is indicative of the medication being used (or not used) in a way different from what was prescribed by the medical professional, the system 10 can be configured to send out alerts for non-compliance.

Figure 9:
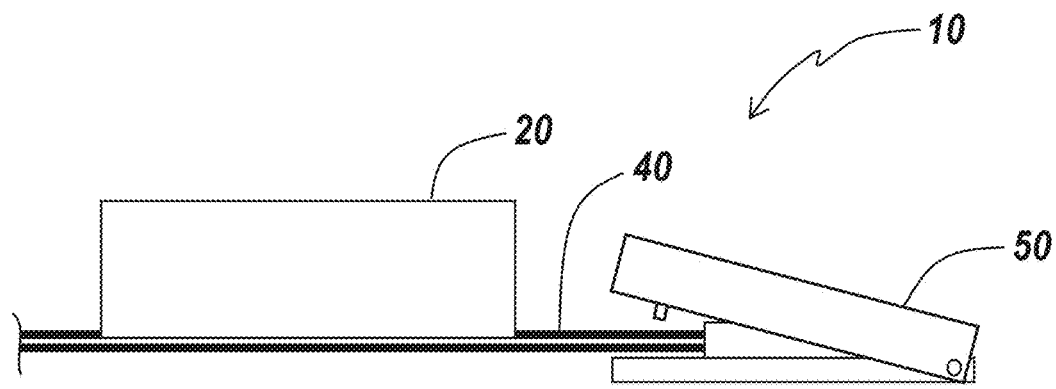
FIG. 9 is a side-view schematic illustration of the connectable wireless tag for use with the system for wireless medication compliance sensing, in accordance with the first exemplary embodiment of the present disclosure.
Figure 10:
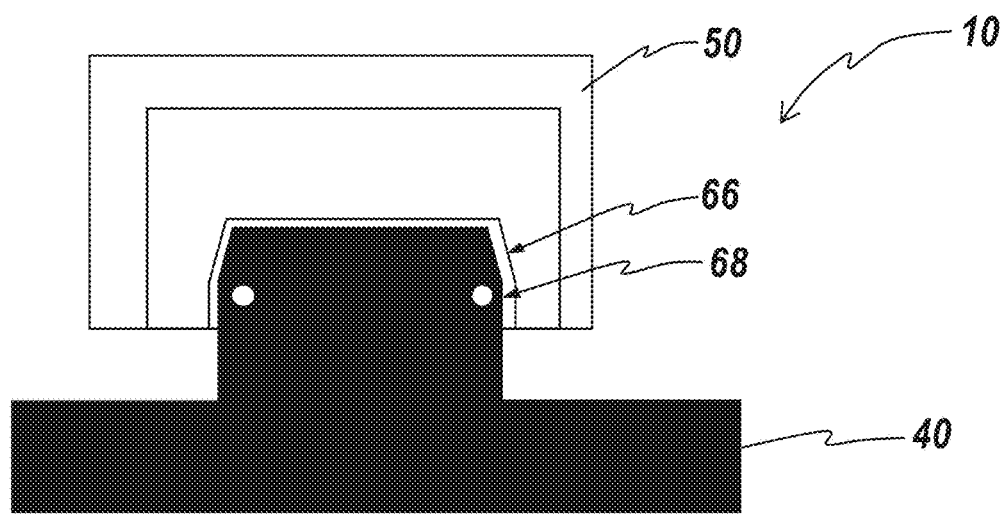
FIG. 10 is a top view schematic illustration of the connectable wireless tag for use with the system for wireless medication compliance sensing, in accordance with the first exemplary embodiment of the present disclosure.

FIG. 9 is a side-view schematic illustration of the connectable wireless tag 50 for use with the system for wireless medication compliance sensing 10, in accordance with the first exemplary embodiment of the present disclosure. FIG. 10 is a top view schematic illustration of the connectable wireless tag 50 for use with the system for wireless medication compliance sensing 10, in accordance with the first exemplary embodiment of the present disclosure. Relative to FIGS. 9-10, the wireless tag 50 may be attached to the sensor array 40 on the housing 20 using a variety of mechanical systems. For example, the wireless tag 50 may be removably connectable to the sensor array 40 with a spring clip or spring-loaded hinged connection which is clipped on to a portion of the sensor array 40. When the wireless tag 50 mechanically clips on to the sensor array 40, electrical contacts on the wireless tag 50 may electrically connect with the sensor array 40 to successfully facilitate an electrical connection between the two structures. The spring clip, as shown in FIG. 9, may include a wireless tag 50 with an upper portion and a lower portion and hinge therebetween. A spring or similar biasing element may allow the upper and lower portions to close on the sensor array 40 and remain biased in the closed position.

There are several other designs which may be used for attaching the wireless tag 50 to the sensor array 40. For example, a preferred method may be to have the wireless tag 50 slide on to the sensor array 40 with guides which align the contact on the wireless tag 50 to the printed contacts on the sensor array 40. A clam-shell like opening on the side of the wireless tag 50 may allow the user to slide it into place without any resistance. Snapping the wireless tag 50 closed may lock it onto the sensor array 40. A simple snap release may allow the wireless tag 50 to be opened and removed from the sensor array 40 for reuse.

The wireless tag 50 may also utilize an alignment guide 66 for aligning the wireless tag 50 to the sensor array 40. The alignment guide 66 may include a guiding structure on the wireless tag 50 which aligns with predetermined alignment holes 68 on the sensor array 40. To properly align the sensor array 40 to the wireless tag 50, the user may engage the alignment holes 68 with posts of the alignment guide 66. This alignment may properly position conductive traces of the sensor array 40 with the proper electrical contacts of the wireless tag 50.

Figure 11:
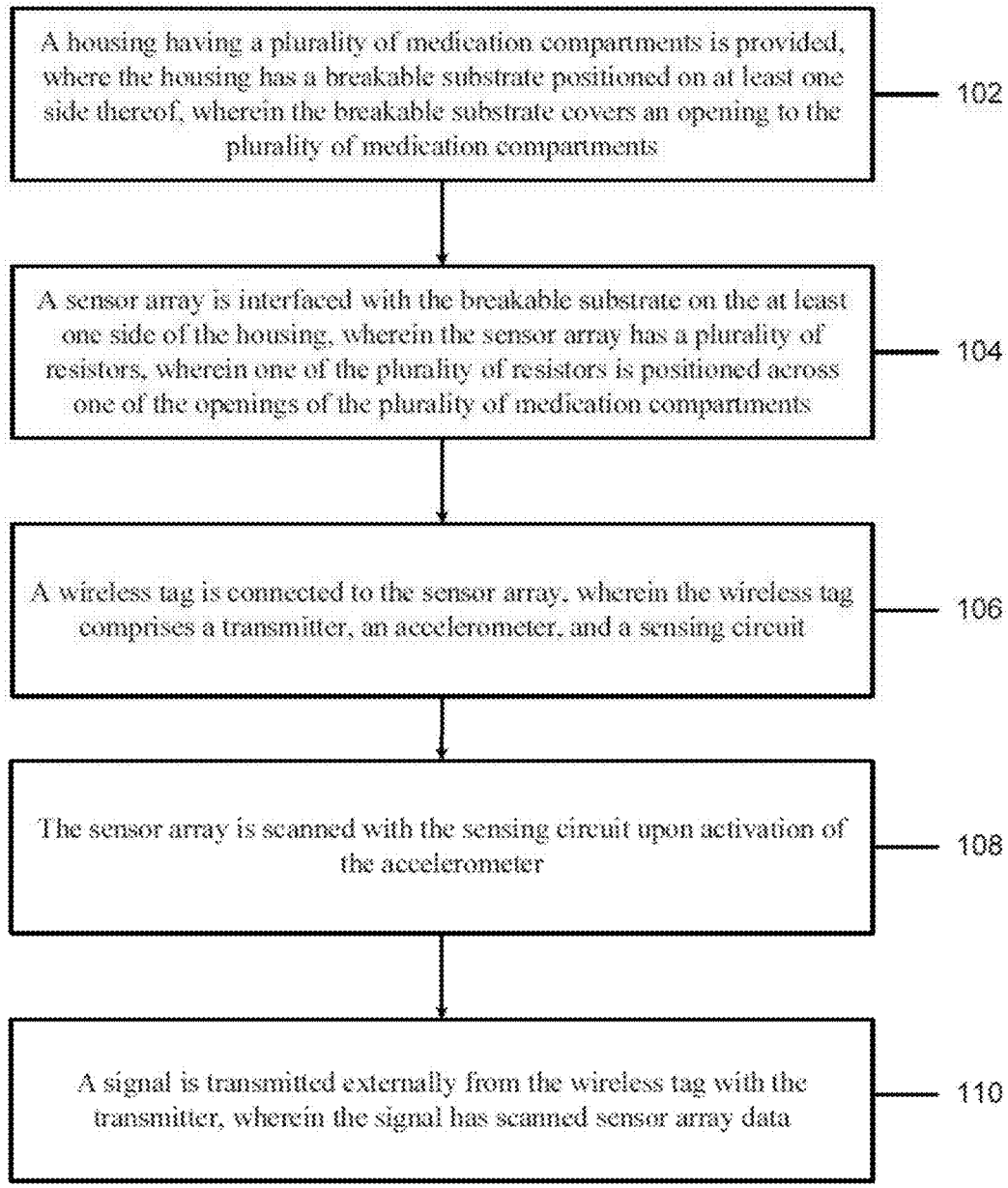
FIG. 11 is a flowchart of a method for wirelessly sensing medication compliance, in accordance with the first exemplary embodiment of the present disclosure.

FIG. 11 is a flowchart 100 of a method for wirelessly sensing medication compliance, in accordance with the first exemplary embodiment of the present disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As is shown in FIG. 11, a housing having a plurality of medication compartments is provided, where the housing has a breakable substrate positioned on at least one side thereof, wherein the breakable substrate covers an opening to the plurality of medication compartments (block 102). A sensor array is interfaced with the breakable substrate on the at least one side of the housing, wherein the sensor array has a plurality of resistors, wherein one of the plurality of resistors is positioned across one of the openings of the plurality of medication compartments (block 104). A wireless tag is connected to the sensor array, wherein the wireless tag comprises a transmitter, an accelerometer, and a sensing circuit (block 106). The sensor array is scanned with the sensing circuit upon activation of the accelerometer (block 108). A signal is transmitted externally from the wireless tag with the transmitter, wherein the signal has scanned sensor array data (block 110).

The method may include any number of additional steps, processes, or functions, including all disclosed within this disclosure. For example, the signal may be externally transmitted from the housing using the wireless transmitter transmitting the signal using short-wavelength UHF radio waves in an ISM band of between 2.4 GHz and 2.485 GHz. A quantity of power may be provided to at least the processor and the accelerometer, wherein the accelerometer uses less than 10 µAh of the quantity of power. Scanning the sensor array with the sensing circuit upon activation of the accelerometer may include sensing a break in the breakable substrate and one of the plurality of resistors over the opening to one of the plurality of medication compartments with a wireless tag connectable to the sensor array. Scanning may also include using at least one of a control row and a control column to sense a size of the sensor array. Scanning the sensor array with the sensing circuit upon activation of the accelerometer may also include scanning the sensor array to sense an operation of each of the plurality of resistors individually.

After the signal with the scanned sensor array data is transmitted externally from the wireless tag with the transmitter, the method may optionally include a number of other steps. For example, the scanned sensor array data may be forwarded from the data bridge to a server for processing or analysis of the scanned sensor array data. In one example, a medication compliance application may be used to analyze the scanned sensor array data relative to a predefined medication regiment to determine whether the scanned sensor array data indicates compliance or non-compliance between the patient's usage of the medication and the specified regiment. The system may communicate various notifications to the patient, to the prescribing medical professional, or to another party, such as a caregiver, to indicate compliance with the medication regiment or to indicate that further action is needed. The system can also be used to send reminders to patients using automated electronic communications (text messages, e-mails, phone calls, etc.).

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A wireless tag apparatus comprising:
    a motion detector configured to detect at least one of a movement of the wireless tag apparatus and an impact to the wireless tag apparatus;
    a sensing circuit configured to scan, in response to the detection by the motion detector of the at least one of the movement of the wireless tag apparatus and the impact to the wireless tag apparatus, a sensor array associated with a medication dispenser external to the wireless tag apparatus to determine whether contents of at least one medication compartment of the medication dispenser have been expelled, wherein the sensing circuit is configured to scan the sensor array:
        at a first scan rate when the motion detector has detected the at least one of the movement of the wireless tag apparatus and the impact to the wireless tag apparatus; and
        at a second scan rate that is lower than the first scan rate when the motion detector has not detected at least one of the movement of the wireless tag apparatus and the impact to the wireless tag apparatus; and
    a transmitter configured to transmit, in response to the detection by the motion detector of the at least one of the movement of the wireless tag apparatus and the impact to the wireless tag apparatus, a first signal including data pertaining to whether the contents of the at least one medication compartment have been expelled, wherein the first signal is a radio frequency signal.

2. The wireless tag apparatus of claim 1, wherein:
    to determine whether the contents of the at least one medication compartment have been expelled, the sensing circuit is configured to detect whether a resistor of the sensor array has been broken, the resistor being disposed over an opening associated with the at least one medication compartment; and
    the data pertaining to whether the contents of the at least one medication compartment have been expelled includes data pertaining to whether the resistor has been broken.

3. The wireless tag apparatus of claim 2, wherein:
    the sensing circuit is further configured to scan the sensor array to determine whether each individual resistor of a plurality of resistors of the sensor array is operational; and
    the first signal further includes data pertaining to whether each individual resistor of the plurality of resistors is operational.

4. The wireless tag apparatus of claim 1, wherein the first signal further includes data pertaining to at least one of:
    an identification of the wireless tag apparatus;
    whether the wireless tag apparatus is operational;
    whether the sensor array is operational;
    whether the wireless tag apparatus and the sensor array are operatively coupled with one another;
    a size of the sensor array;
    a power level of a battery hosted by the wireless tag apparatus; and
    a signal strength of the first signal.

5. The wireless tag apparatus of claim 1, wherein the first signal is a Bluetooth signal in an ISM band having a frequency of between 2.4-2.485 GHz.

6. The wireless tag apparatus of claim 1, wherein the first signal is a Wi-Fi signal in an ISM band having a frequency of between 2.4-2.485 GHz.

7. The wireless tag apparatus of claim 1, wherein the transmitter is configured to transmit the first signal after each scan of the sensor array by the sensing circuit.

8. The wireless tag apparatus of claim 1, wherein the transmitter is configured to transmit the first signal after multiple consecutive scans of the sensor array by the sensing circuit.

9. The wireless tag apparatus of claim 1, wherein the sensing circuit is further configured to scan the sensor array at a fixed time interval.

10. The wireless tag apparatus of claim 1, further comprising a processor, wherein:
    the motion detector is configured to output a second signal in response to the detection of the at least one of the movement of the wireless tag apparatus and the impact to the wireless tag apparatus; and
    the processor is configured to receive the second signal and, in response thereto:
        transition out of a sleep state;
        process data included in the second signal; and
        instruct the sensing circuit to scan the sensor array.

11. The wireless tag apparatus of claim 10, wherein the processor comprises a microcontroller unit configured to utilize a Bluetooth Low Energy communication protocol.

12. The wireless tag apparatus of claim 1, wherein the motion detector comprises a microelectromechanical systems accelerometer configured to use 10 µAh or less of electric charge provided by a battery hosted by the wireless tag apparatus.

13. The wireless tag apparatus of claim 1, further comprising:

a timer configured to output a second signal periodically; and a processor configured to receive the second signal and, in response thereto:
   transition out of a sleep state; and
   instruct the sensing circuit to scan the sensor array.

14. The wireless tag apparatus of claim 13, wherein the timer is native to the processor.

15. The wireless tag apparatus of claim 1, further comprising:
a button feature configured to output a second signal when activated; and
a processor configured to receive the second signal and, in response thereto:
   transition out of a sleep state; and
   instruct the sensing circuit to scan the sensor array.

16. The wireless tag apparatus of claim 1, further comprising a sensor array input connection configured to be electrically coupled with the sensor array.

17. The wireless tag apparatus of claim 1, wherein the medication dispenser comprises a blister pack.

18. A method of monitoring medication compliance via a wireless tag apparatus, the method comprising:
detecting at least one of a movement of the wireless tag apparatus and an impact to the wireless tag apparatus;
scanning, in response to detecting the at least one of the movement of the wireless tag apparatus and the impact to the wireless tag apparatus, a sensor array associated with a medication dispenser external to the wireless tag apparatus to determine whether contents of at least one medication compartment of the medication dispenser have been expelled, wherein scanning the sensor array occurs:
   at a first scan rate when the at least one of the movement of the wireless tag apparatus and the impact to the wireless tag apparatus has been detected; and
   at a second scan rate that is lower than the first scan rate when at least one of the movement of the wireless tag apparatus and the impact to the wireless tag apparatus has not been detected; and
transmitting, in response to detecting the at least one of the movement of the wireless tag apparatus and the impact to the wireless tag apparatus, a first signal including data pertaining to whether the contents of the at least one medication compartment have been expelled, wherein the first signal is a radio frequency signal.

19. The method of claim 18, wherein:
to determine whether the contents of the at least one medication compartment have been expelled, the method comprises detecting whether a resistor of the sensor array has been broken, the resistor being disposed over an opening associated with the at least one medication compartment; and
the data pertaining to whether the contents of the at least one medication compartment have been expelled includes data pertaining to whether the resistor has been broken.

20. The method of claim 19, wherein:
the method further comprises scanning the sensor array to determine whether each individual resistor of a plurality of resistors of the sensor array is operational; and
the first signal further includes data pertaining to whether each individual resistor of the plurality of resistors is operational.

21. The method of claim 18, wherein the first signal further includes data pertaining to at least one of:
an identification of the wireless tag apparatus;
whether the wireless tag apparatus is operational;
whether the sensor array is operational;
whether the wireless tag apparatus and the sensor array are operatively coupled with one another;
a size of the sensor array;
a power level of a battery hosted by the wireless tag apparatus; and
a signal strength of the first signal.

22. The method of claim 18, wherein the first signal is a Bluetooth signal in an ISM band having a frequency of between 2.4-2.485 GHz.

23. The method of claim 18, wherein the first signal is a Wi-Fi signal in an ISM band having a frequency of between 2.4-2.485 GHz.

24. The method of claim 18, wherein transmitting the first signal occurs after each scan of the sensor array by the sensing circuit.

25. The method of claim 18, wherein transmitting the first signal occurs after multiple consecutive scans of the sensor array by the sensing circuit.

26. The method of claim 18, wherein scanning the sensor array occurs at a fixed time interval.

* * * * *